United States Patent [19]

Nakamura et al.

[11] Patent Number: 4,878,217
[45] Date of Patent: Oct. 31, 1989

[54] DATA OUTPUTTING DEVICE

[75] Inventors: Norimasa Nakamura; Satoshi Kishimoto, both of Saitama, Japan

[73] Assignee: Pioneer Ansafone Manufacturing Corporation, Saitama, Japan

[21] Appl. No.: 150,855

[22] Filed: Feb. 1, 1988

[30] Foreign Application Priority Data

Jan. 30, 1987 [JP] Japan .................................. 62-20116

[51] Int. Cl.$^4$ ............................................... H04J 3/02
[52] U.S. Cl. ........................................ 370/77; 379/88
[58] Field of Search ................. 370/77, 110.2; 379/88, 379/89

[56] References Cited

U.S. PATENT DOCUMENTS 4,227,248 10/1980 Munter ............................. 370/110.2
4,785,473 11/1988 Pfeiffer .................................... 379/89
4,791,660 12/1988 Oye et al. .............................. 379/88

FOREIGN PATENT DOCUMENTS 2076614 12/1981 United Kingdom ............. 370/110.2

Primary Examiner—Douglas W. Olms
Attorney, Agent, or Firm—Sughrue, Mion, Zinn, Macpeak & Seas

[57] ABSTRACT

In a data outputting device, data to be outputted is digitally stored in a memory and is read out when addressed over a predetermined period in a time division multiplex mode with addresses which are provided by a counter in such a manner that the number thereof of addresses provided per predetermined time period corresponds to the number of channels employed, and the data thus read out with the addresses are selected for the channels by a selection circuit, respectively, so that they are outputted separately according to the channels.

5 Claims, 4 Drawing Sheets

DATA OUTPUTTING DEVICE

BACKGROUND OF THE INVENTION

This invention relates to a data outputting device suitable, for instance, for transmitting the same data through telephone lines to a number of calling parties in a time division mode.

A system for supplying predetermined information (for instance a weather forecast) to a number of calling parties through telephone lines is known in the art. A sound source for the system is, for instance, a magnetic tape recorder. In response to access made by a calling party, the magnetic tape recorder is operated so that data (message) recorded in the magnetic tape are transmitted through the telephone lines to the calling party.

When access is made by a calling party during the operation of the magnetic tape recorder in response to a prior call, the data transmitted to the calling party often times begins halfway through the message. This difficulty has been eliminated by a method disclosed, for instance, by Japanese Patent Application (OPI) No. 104358/1982 (the term "OPI" as used herein means an "unexamined published application") in which a plurality of magnetic tape recorders are operated in a time division mode.

However, such a method is disadvantageous in that, because of the provision of a plurality of magnetic tape recorders as sound sources, the system is unavoidably intricate in arrangement and accordingly high in manufacturing cost.

SUMMARY OF THE INVENTION

Accordingly, an object of this invention is to provide a data outputting device simple in construction which can form and output a plurality of messages equal in content, whose beginnings are shifted in time from one another.

The foregoing object and other objects of the invention have been achieved by the provision of a data outputting device for outputting a plurality of messages, each equal in content and whose beginnings are shifted in time from one another, the device comprising: a memory for storing data in a digital mode; a counter for successively providing a number of addresses each corresponding to a communication channel available in a predetermined period, each channel assigned to a designated time slot of the predetermined period; and a selection circuit for selectively providing to the channels the data from the memory read out in accordance with the addresses provided by the counter.

The nature, principle and utility of the invention will become more apparent from the following detailed description when read in conjunction with the accompanying drawings.

DETAILED DESCRIPTION OF THE INVENTION

Figure 1:
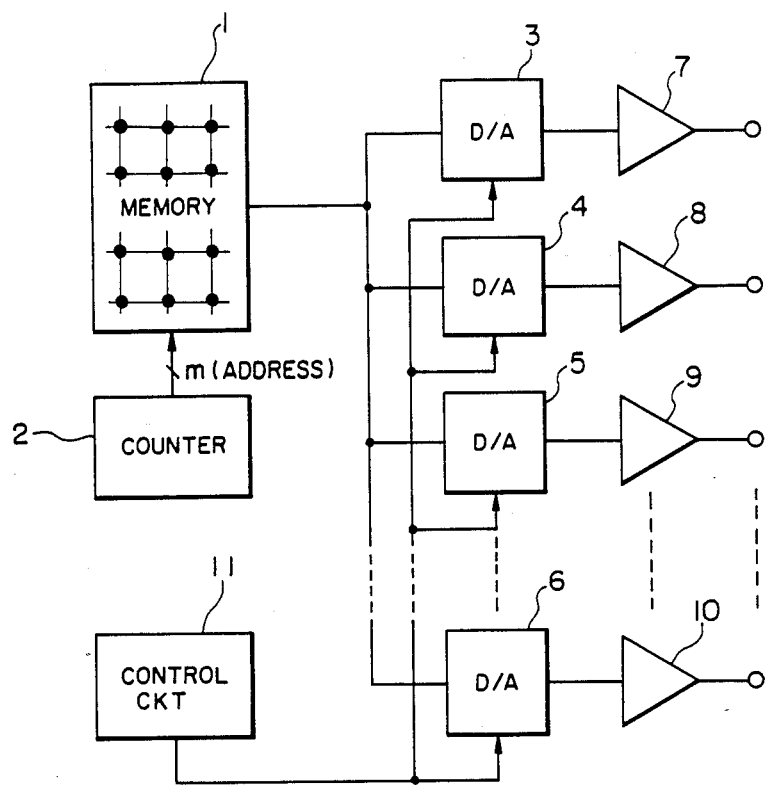
FIG. 1 is a block diagram showing a data outputting device according to this invention.

A data outputting device according to this invention, is shown in FIG. 1. This device comprises a memory 1 such as a RAM (random access memory) in which a message (data) having a predetermined length is stored in a digital mode; and a counter 2 for providing an address for accessing data to be read out of the memory 1. Where the memory 1 stores a message of $2^m$ bits, the counter must have an m bits content to specify the address of the $2^m$ bits.

The data read out of the memory 1 is applied to D/A (digital-to-analog) conversion circuits 3, 4, 5, provided separately according to channels, so that they are subjected to digital-to-analog conversion. The outputs of the circuits 3, 4, 5, . . ., after being amplified by amplifiers 7, 8, 9, . . ., are outputted as messages separately according to the channels. The number of channels (or the number of available messages) is $2^n$.

Figure 2:
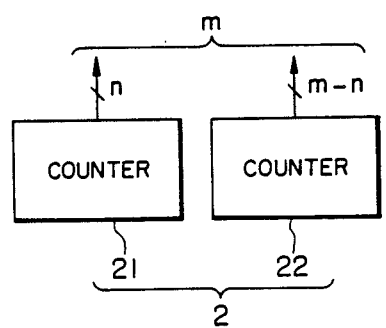
FIG. 2 is a block diagram showing a counter in the data outputting device of the invention.

The counter 2, as shown in FIG. 2, is made up of two counter units 21 and 22 which are different in operating speed. With an address of m bits, the higher order n bits are formed by the counter unit 21, and the remaining or lower order m-n bits are formed by the counter unit 22.

Figure 3:
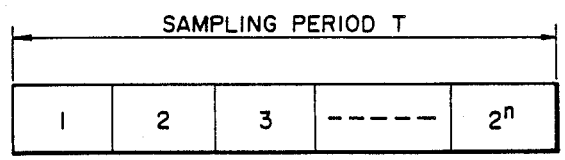
FIG. 3 is an explanatory diagram showing time slots corresponding to the number of channels provided by the counter.

The counter 2, as shown in FIG. 3, defines time slots of a predetermined sampling period, obtained by dividing the predetermined sampling period T by $2^n$, corresponding to the number of channels, and outputs an address (or a group of addresses) for each time slot in succession.

Figure 4:
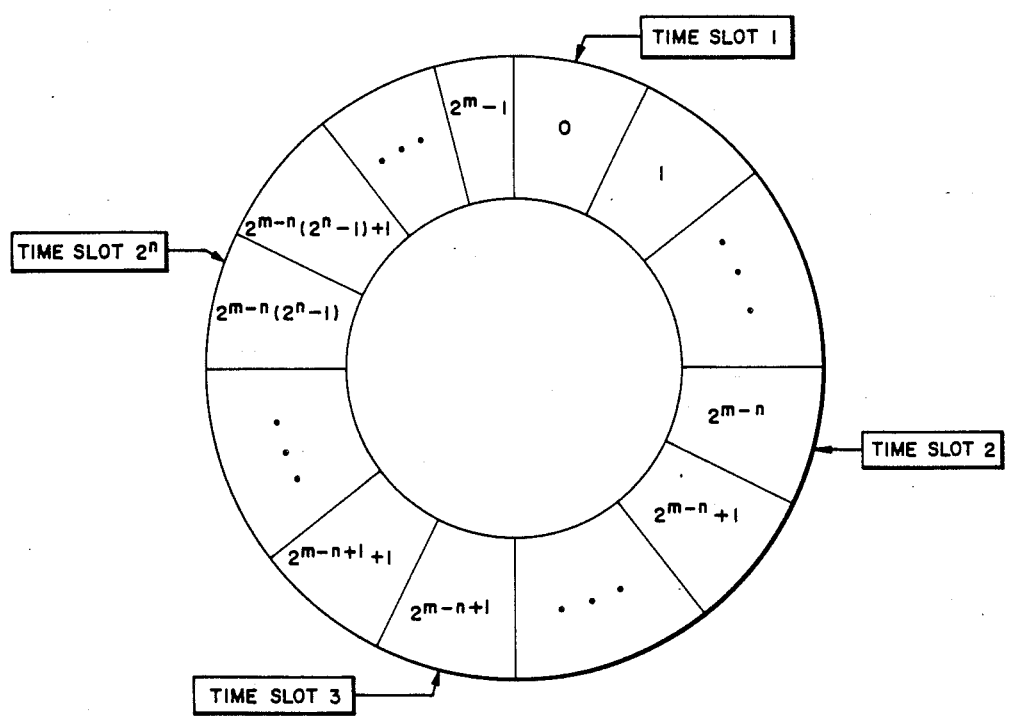
FIGS. 4 and 5 are explanatory diagrams showing addresses in the memory.

As shown in FIG. 4, the memory 1 has $2^m$ addresses from the 0-th address to the $(2^m-1)$-th address. Therefore, if the data corresponding to the addresses are read out beginning with the data of the 0-th address, then the complete message from the beginning thereof is outputted in its entirety. If address 0 is provided at the first time slot (S1) in a period T ($T_1$), then address $2^{m-n}$ is obtained at the second time slot (S2), address $2^{m-n+1}$ is obtained at the third time slot, and so forth due to the high order n bits and the fact the low order m-n bits are not incremented until the next period $T_2$. The address number is increased by $2^{m-n}$ for each channel so that address $2^{m-n}(2^n-1)$ is obtained at the final time slot, or at the $2^n$-th time slot of period $T_1$.

In the next period T ($T_2$), the first time slot address 1 is obtained by increasing the address number of address 0 provided at the first time slot of the first period $T_1$ by 1. In the period $T_2$, at the second, third, . . . time slots, addresses are obtained by increasing the address number of address 1 of the first time slot of period $T_2$ by $2^{m-n}$, $2^{m-n+1}$, . . . respectively.

For the purpose of providing the above-described addresses, the counter 2 is made up of the counter units 21 and 22. Increment occurs in the counter 21 every period of $T/2^n$ which provides the high order n bits of the m bits, whereas increment occurs in the counter 22 every period T which provides the low order (m−n) bits.

Figure 5:
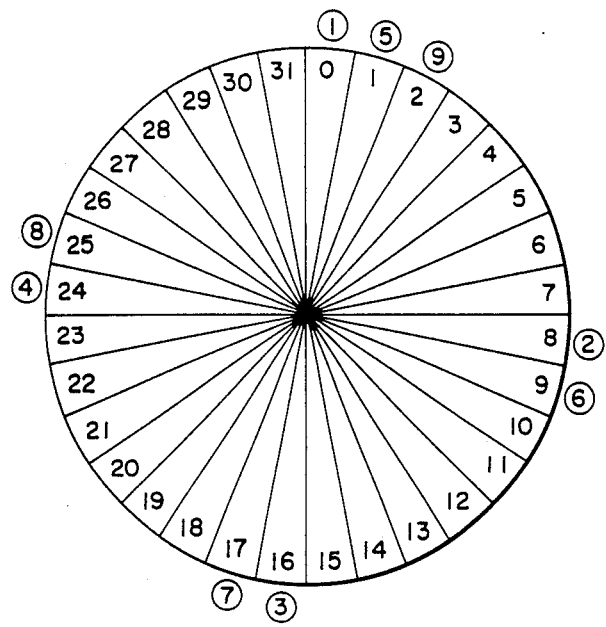

It is assumed that m=5 and n=2. In this case, the memory 1 has 32 (=$2^5$) addresses, as shown in FIG. 5. At the first time slot of the first period $T_1$, address 0 is provided. Addresses 8, 16 and 24 are successively outputted increasing by 8 (=$2^3$). At the time slots of the second period $T_2$, addresses 1, 9, 17 and 25 are provided, respectively.

Figure 6:
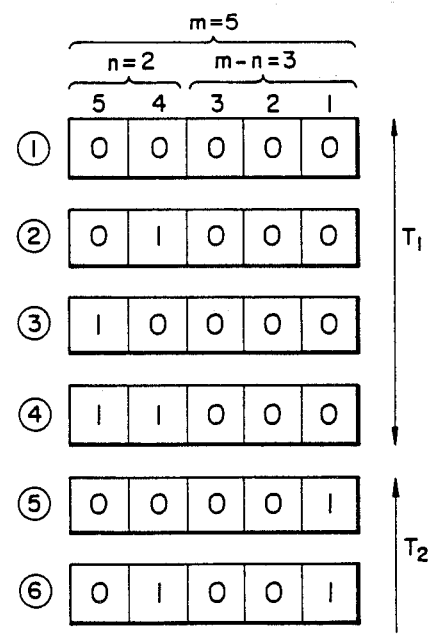
FIGS. 6 and 7 are also explanatory diagrams showing addresses outputted by the counter.

For the purpose of providing 5 (m=5) bits addresses as described above, as shown in FIG. 6, the counter 2 is divided into the counter units 21 for the higher order 2 (n=2) bits (the 4th and 5th bits) and the counter units 22 for the lower order 3 (m−n=5−2) bits (the 1st, 2nd and 3rd bits). In a period $T_i$, the counter unit 21 outputs values (00), (01), (10), (11), ... successively. Therefore, the counter units 21 and 22 output, in combination, values (00000), (01000), (10000), (11000), (00001), (01001), (i.e., 0, 8, 16, 24, 1, 9, ... in decimal number).

Figure 7:
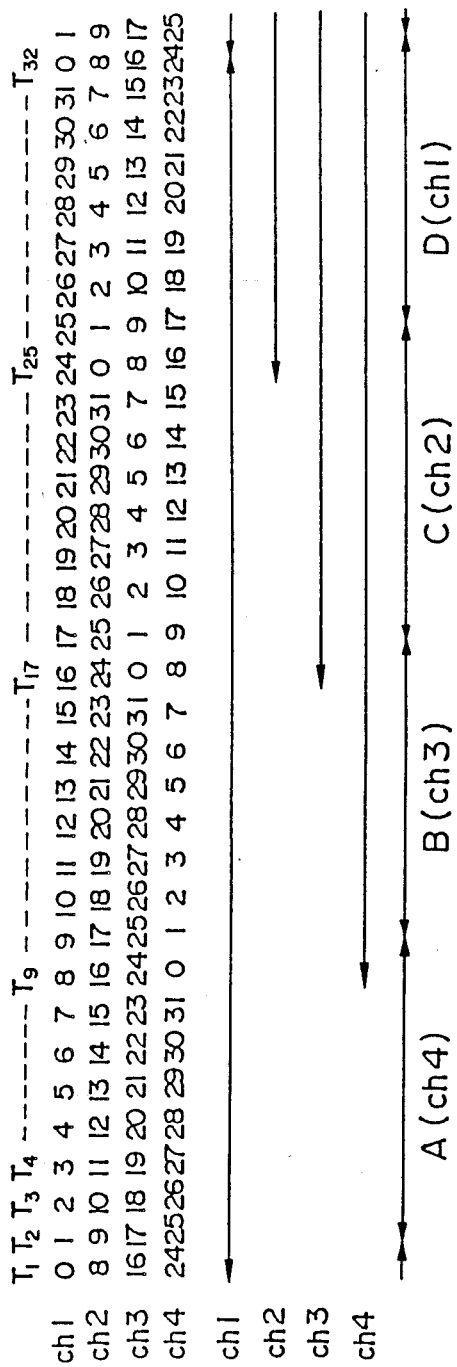

The addresses provided in period ($T_i$) in the above-described manner can be arranged for the corresponding time slots as shown in FIG. 7. That is, for the first time slot of a period T, which is assigned to ch 1, the beginning of the message is positioned in the period $T_1$, and for the second (ch 2), third (ch 3) and fourth (ch 4) time slots, the beginning of the messages (address 0) are positioned in the periods $T_{25}$, $T_{17}$ and $T_9$, respectively.

The control circuit 11 controls the D/A conversion circuits 3, 4, 5, 6, ... of the channels so that the above-described time slots correspond to the output channels, respectively. More specifically, only the D/A conversion circuit 3 of the first channel is activated while the remaining D/A conversion circuits 4, 5, ... are not activated so that only the data read out of the address of the first time slot (S1) in a period $T_i$ is applied to the D/A conversion circuit 3 of the first channel. For example, although during sampling period $T_1$ address locations 0, 8, 16 and 24 are applied to memory 1, only data stored in memory address 0 can be outputted from D/A converter 3 (ch.1), as shown in FIG. 7. Similarly, the second, third, fourth, ... time slots correspond to the second, third, fourth, ... channels, respectively. Thus, the D/A conversion circuits 3, 4, 5, 6, ... and the control circuit 11 form a selection circuit for selecting the data for the channels, respectively, which are read out in a time division multiplex mode for the time slots.

As is apparent from FIG. 7, when access is made by a calling party during the interval A of from the period $T_2$ to the period $T_9$, the message provided by the fourth channel is supplied to the calling party. Similarly, when access is made by a calling party during the interval B of from the period $T_{10}$ to the period $T_{17}$, the message provided by the third channel is supplied to the calling party; and when access is made by a calling party during the interval C of from the period $T_{18}$ to the period $T_{25}$, the message provided by the second channel is supplied to the calling party; and when access is made by a calling party during the interval D of from the period $T_{26}$ to the period $T_{32}$ ($T_1$), the message provided by the first channel is supplied to the calling party.

When access is made by a calling party, the corresponding channel is selected at the rear stage of the output terminals of the channels. In the case when access is made by a plurality of calling parties in the same interval, the message of one and same channel is supplied to the plurality of calling parties.

As was described above, the data outputting device for outputting a plurality of messages (data) equal in content whose beginnings are shifted in time from one another, according to the invention, comprises: a memory for storing data in a digital mode; a counter for successively providing a number of addresses, the number of addresses corresponding to the number of channels per predetermined period, each channel being assigned a selected time slot of said predetermined period; and a selection circuit for selectively providing to said channels the data stored in said memory which data is read out by the addresses provided by said counter. Thus, a data outputting device simple in construction can output a plurality of messages equal in content whose beginnings are shifted in time from one another in a time division mode.

What is claimed is:

1. A data outputting device for outputting a plurality of data equal in content and whose beginnings are shifted in time from one another, comprising:
   a memory for storing said data in a digital mode;
   a counter for successively providing, during each of a plurality of predetermined periods, memory addresses whose number corresponds to a number of channels employed;
   a selection circuit means for selectively providing to said channels said data stored in said memory and read out in accordance with said addresses provided by said counter.

2. A data outputting device as claimed in claim 1 wherein said counter includes a first counter section and a second counter section, said first counter section defining the high order bits of said memory addresses and said second counter section defining the low order bits of said memory addresses; and
   means for incrementing said second counter section only once per predetermined period, said first counter section being incremented a number of times during each predetermined period equal to the number of channels employed to define a time slot for each channel during each predetermined period.

3. A data outputting device as claimed in claim 2 wherein said selection circuit means comprises a plurality of digital-to-analog converter means, one associated with a respective one of said channels and control circuit means responsive to each time slot of a predetermined period for enabling only the digital-to-analog converter means associated with the channel of the then occurring time slot.

4. A data outputting device as claimed in claim 2 wherein $2^n$ channels are employed and said memory stores $2^m$ bits, said first counter section contains $2^n$ stages, and said second counter section contains $2^{m-n}$ stages.

5. A method of outputting a plurality of messages equal in content from a memory storing said message comprising the steps of:
   providing a memory of intersecting electrical rows and columns, each intersecting row and column defining a one bit memory location,
   selecting the memory capacity of said memory equal to the number of bits, $2^m$, of the message to be read out;
   defining a number of channels, $2^n$, to be transmitted during a predetermined time period, $T_i$, and assigning each channel to a time slot ($S_i$) of the predetermined period, the width of time slots being determined by dividing the predetermined period $T_i$ by the number of channels, $2^n$;
   selecting said memory to have a number of electrical rows equal to the number of channels, each row having a number of electrical columns equal to $2^{m-n}$;
   addressing said memory such that during each predetermined period, $T_i$, a single column of stored bits is read out beginning from the first column wherein is stored the first bit of the message; and reading the successive memory columns during successive periods $T_i$ until all bit locations of the memory have been read into each of the channels, reading of the columns beginning with the first row during the first read out of the memory contents and thereafter for each successive read out of the memory contents each column is read beginning with the next succeeding row from the row first read in the preceding read out of the memory contents.

* * * * *